United States Patent
Lee et al.

(10) Patent No.: US 10,363,932 B2
(45) Date of Patent: Jul. 30, 2019

(54) SSC-SCC SYSTEM FOR INCREASING SSC DISTANCE USING SSC AND METHOD FOR CONTROLLING THE SAME

(71) Applicant: Hyundai Motor Company, Seoul (KR)

(72) Inventors: Hyung-Ju Lee, Gyeonggi-do (KR); Jae-Bok Choi, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 325 days.

(21) Appl. No.: 15/361,712

(22) Filed: Nov. 28, 2016

(65) Prior Publication Data

US 2017/0274900 A1 Sep. 28, 2017

(30) Foreign Application Priority Data

Mar. 24, 2016 (KR) .................. 10-2016-0035128

(51) Int. Cl.
*B60W 30/16* (2012.01)
*B60W 10/02* (2006.01)
(Continued)

(52) U.S. Cl.
CPC .......... *B60W 30/162* (2013.01); *B60W 10/02* (2013.01); *B60W 10/06* (2013.01); *B60W 10/184* (2013.01); *B60W 30/16* (2013.01); *B60W 30/18072* (2013.01); *F02N 11/0803* (2013.01); *F02N 11/0814* (2013.01); *B60W 2030/1809* (2013.01); *B60W 2510/0208* (2013.01); *B60W 2520/10* (2013.01); *B60W 2540/10* (2013.01); *B60W 2540/12* (2013.01); *B60W 2550/308* (2013.01);
(Continued)

(58) Field of Classification Search
CPC .... B60W 10/02; B60W 10/06; B60W 10/184; B60W 30/16; B60W 30/162
See application file for complete search history.

(56) References Cited

U.S. PATENT DOCUMENTS 5,839,534 A * 11/1998 Chakraborty ...... B60K 31/0008
180/169
6,192,309 B1 * 2/2001 Prestl .................. B60K 31/0008
180/170
(Continued)

FOREIGN PATENT DOCUMENTS

JP   H06-211073 A   8/1994
JP   H06-320979 A   11/1994
(Continued)

*Primary Examiner* — Edwin A Young
(74) *Attorney, Agent, or Firm* — Mintz Levin Cohn Ferris Glovsky and Popeo, P.C.; Peter F. Corless

(57) ABSTRACT

A method for controlling an SSC-SCC system for increasing a SSC distance using SCC is provided. The method includes determining whether a vehicle in operation satisfies a preset SSC entry condition and entering the SSC mode or maintaining the SSC entry state when the vehicle satisfies the preset SSC entry condition. A distance from a preceding vehicle is measured after the entering of the SSC mode or the maintaining of the SSC entry state. Additionally, the method includes determining whether the measured distance is equal to or less than a preset reference distance and performing SCC braking in response to determining that the measured distance is equal to or less than the preset reference distance.

17 Claims, 3 Drawing Sheets

(51) Int. Cl.
  *B60W 10/06* (2006.01)
  *B60W 10/184* (2012.01)
  *B60W 30/18* (2012.01)
  *F02N 11/08* (2006.01)
(52) U.S. Cl.
  CPC ............. *B60W 2710/021* (2013.01); *B60W 2710/0627* (2013.01); *B60W 2750/308* (2013.01); *F02N 11/0837* (2013.01); *F02N 2200/125* (2013.01); *Y02T 10/48* (2013.01); *Y02T 10/76* (2013.01)

(56) References Cited

U.S. PATENT DOCUMENTS

| | | | |
|---|---|---|---|
| 6,615,127 | B2 * | 9/2003 | Hellmann .......... B60K 31/0008 701/96 |
| 2012/0119894 | A1 * | 5/2012 | Pandy .................. B60W 30/16 340/435 |
| 2013/0131948 | A1 | 5/2013 | Iwao et al. |
| 2015/0081189 | A1 * | 3/2015 | Fairgrieve ............. B60W 30/16 701/96 |
| 2017/0015308 | A1 * | 1/2017 | Ortmann ............... B60W 20/40 |

FOREIGN PATENT DOCUMENTS

| | | |
|---|---|---|
| JP | H09-137853 A | 5/1997 |
| JP | 2005-075179 A | 3/2005 |
| JP | 2009-173143 A | 8/2009 |
| JP | 2012-101636 A | 5/2012 |
| JP | 2012-131292 A | 7/2012 |
| JP | 2012-214181 A | 11/2012 |
| JP | 5267685 52 | 8/2013 |
| JP | 2015-058783 A | 3/2015 |
| KR | 2012-0051910 A | 5/2012 |
| KR | 2013-0018358 A | 2/2013 |
| KR | 10-2015-0140768 A | 12/2015 |

* cited by examiner

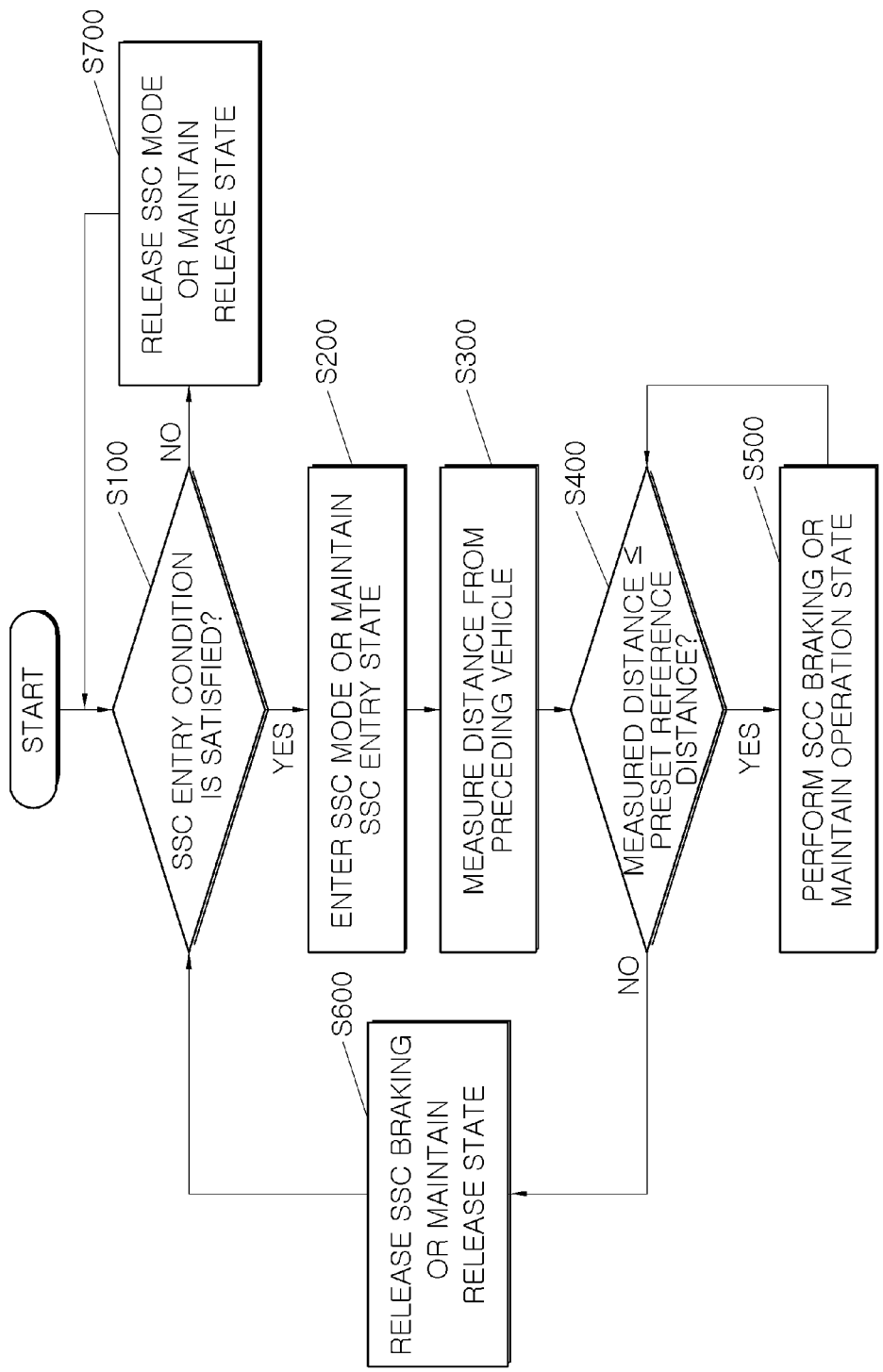

SSC-SCC SYSTEM FOR INCREASING SSC DISTANCE USING SSC AND METHOD FOR CONTROLLING THE SAME

CROSS-REFERENCE TO RELATED APPLICATIONS

This application claims priority to Korean Patent Application No. 10-2016-0035128, filed on Mar. 24, 2016, which is incorporated herein by reference in its entirety.

BACKGROUND

Field of the Invention

The present disclosure relates to a Start/Stop Coasting (SSC)-Smart Cruise Control (SCC) system for increasing a SSC distance using SCC and a method for controlling the same, and more particularly, to a SSC-SCC system which automatically maintains a distance from a preceding vehicle using SCC, even when a brake pedal is disengaged when the distance from the preceding vehicle decreases, and a method for controlling the same.

Description of Related Art

Recently, due to a difference between official fuel efficiency and fuel efficiency during actual travel, consumer dissatisfaction has increased. Thus, it has become important to improve the fuel efficiency during actual travel. In the automobile industry, research and development have been conducted on a technology which is capable of controlling the system of a vehicle and also maximizing fuel efficiency during actual travel, using a driver's driving condition, surrounding traffic situation, road information and the like.

For example, the technology may include a technology for searching and guiding an economical driving path by utilizing IT and traffic information, a technology for guiding fuel efficient driving based on the grade information of a road and the previous travel patterns, a technology for estimating and determining a road grade and traffic information and charging/discharging a battery based on the state of charge (SOC) of the battery, and a technology for selectively controlling a travel mode to minimize fuel consumption based on a route to the destination and traffic information, using a map information database (DB).

Representative examples of the technologies capable of maximizing fuel efficiency may include SSC (Star/Stop Coasting). FIGS. 1A and 1B are diagrams for describing SSC according to the related art. Referring to FIGS. 1A and 1B, SSC refers to a technology which cuts fuel supplied to an engine during coasting, and clutches off power transfer of a transmission (refer to FIG. 1A). Thus, since engine drag torque is blocked, a vehicle to which the SSC is applied has improved mileage than a conventional vehicle (refer to FIG. 1B).

Furthermore, recently a variety of driver assist/support systems have been developed that improve driver convenience and reduce a risk of collision with a preceding obstacle. One of the driver assist/support systems is the SCC. The SCC is an enhanced type of cruise control, which has a following function of sensing a preceding vehicle using a radar sensor and maintaining a specific distance from the preceding vehicle when the preceding vehicle is detected and a preset speed travel function of traveling at a specific speed when a preceding vehicle is not detected.

The SSC operates the vehicle to follow a preceding vehicle while maintaining a specific distance from the preceding vehicle when the preceding vehicle is detected using the radar sensor, and operates the vehicle to travel at a speed preset by a driver when the preceding vehicle is not detected. In the conventional SSC system, a driver may engage a brake pedal for safety, when the distance from the preceding vehicle decreases after the vehicle entered the SSC mode. In particular, since the SSC mode is immediately released, fuel efficiency is not further improved.

SUMMARY

An exemplary embodiment of the present disclosure provides an SSC-SCC system capable of automatically maintaining a distance from a preceding vehicle using SCC, even when a brake pedal is disengaged when the distance from the preceding vehicle decreases, and a method for controlling the same.

Other objects and advantages of the present disclosure can be understood by the following description, and become apparent with reference to the exemplary embodiments of the present disclosure. Also, it is obvious to those skilled in the art to which the present disclosure pertains that the objects and advantages of the present disclosure can be realized by the means as claimed and combinations thereof.

In accordance with an exemplary embodiment of the present disclosure, a method for controlling an SSC-SCC system for increasing an SSC distance using SCC is provided and may include: determining (S100) whether a vehicle in operation satisfies a preset SSC entry condition; entering the SSC mode or maintaining the SSC entry state (S200), when the vehicle satisfies the preset SSC entry condition; measuring (S300) a distance from a preceding vehicle after the entering of the SSC mode or the maintaining of the SSC entry state (S200); determining (S400) whether the measured distance is equal to or less than a preset reference distance; and performing (S500) SCC braking in response to determining that the measured distance is equal to or less than the preset reference distance.

The determination (S400) of whether the measured distance is equal to or less than the preset reference distance may be repeated after performing (S500) the SCC braking. The method may further include releasing the SCC braking or maintaining the SCC braking release state (S600), in response to determining that the measured distance exceeds the preset reference distance. The determination (S100) of whether the vehicle in operation satisfies the preset SSC entry condition may be repeated, after the releasing of the SCC braking or the maintaining of the SCC braking release state (S600).

The method may further include releasing the SSC entry state or maintaining the SSC release state (S400), in response to determining that the vehicle in operation does not satisfy the preset SSC entry condition. The preset SSC entry condition may include a condition in which an accelerator pedal remains disengaged, a brake pedal remains disengaged, and the current vehicle speed is equal to or greater than a preset reference vehicle speed.

The entering of the SSC mode or the maintaining of the SSC entry state (S200) may include stopping an engine by cutting off fuel supply to the engine, and releasing a clutch. The performing (S500) of the SCC braking may include operating a brake in a state where an engine is stopped and a clutch is released, or maintaining the operation state of the brake. The releasing of the SCC braking or the maintaining of the SCC braking release state (S600) may include releasing the operation of a brake in a state where an engine is stopped and a clutch is released. Additionally, the releasing of the SSC entry state or the maintaining of the SSC release state (S700) may include restarting an engine by resuming fuel supply to the engine, and engaging a clutch.

In accordance with another exemplary embodiment of the present disclosure, an SSC-SCC system for increasing an SSC distance using SCC may include: a storage medium configured to store a method for operating the SSC-SCC system for increasing an SSC distance using SCC; a sensing unit configured to sense a current vehicle speed, a distance from a preceding vehicle, and whether an accelerator pedal and a brake pedal are operated; and a controller configured to operate a vehicle based on the control method of the SSC-SCC system stored in the storage medium, based on the current vehicle speed, the distance from the preceding vehicle, and the operation states of the accelerator pedal and the brake pedal, which are sensed by the sensing unit.

The SSC-SCC system may further include an engine stopped or restarted by the controller. The SSC-SCC system may further include a clutch engaged or released by the controller. Additionally, the SSC-SCC system may include a brake operated or released by the controller. The sensing unit may include a vehicle speed sensor configured to sense the current vehicle speed; a distance sensor configured to sense the distance from the preceding vehicle; an Accelerator Pedal Position Sensor (APS) configured to sense whether the accelerator pedal is operated; and a Brake Pedal Position Sensor (BPS) configured to sense whether the brake pedal is operated. The controller may include an electronic control unit (ECU) configured to operate an engine and a clutch to cause the vehicle to enter the SSC mode or release the vehicle from the SSC entry state; and a SCC unit configured to operate a brake to maintain the distance from the preceding vehicle at a preset reference distance or greater.

BRIEF DESCRIPTION OF THE DRAWINGS

FIG. 2 is a flowchart illustrating a method for controlling an SSC-SCC system for increasing an SSC distance using SCC in accordance with an exemplary embodiment of the present disclosure.

DETAILED DESCRIPTION

Figure 1A:
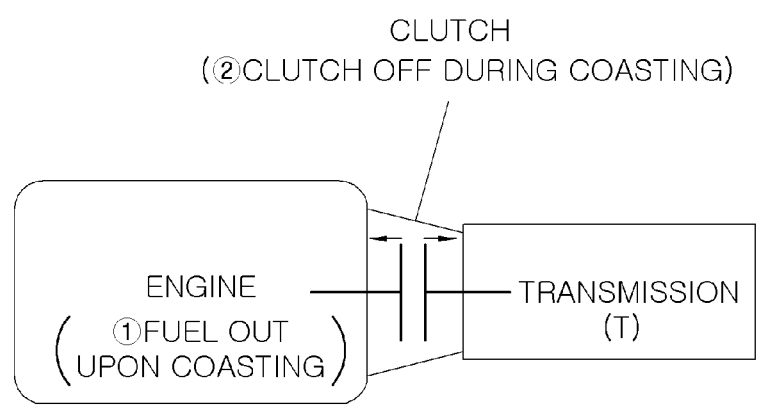
FIGS. 1A and 1B are diagrams for describing SSC according to the related art.
Figure 1B:
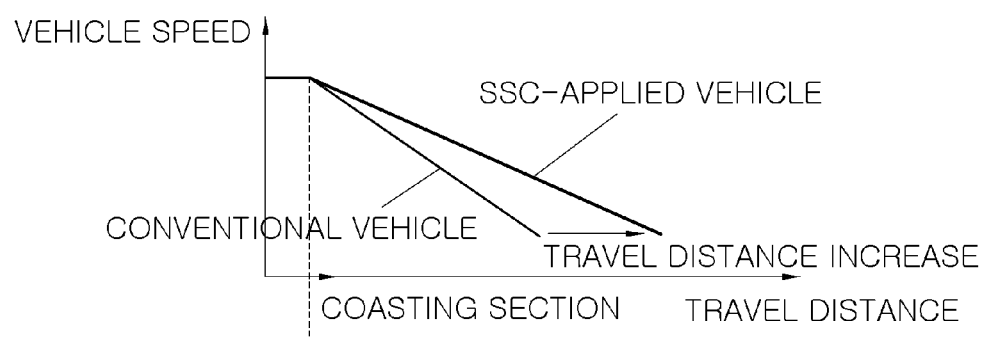

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Exemplary embodiments of the present disclosure will be described below in more detail with reference to the accompanying drawings. The present disclosure may, however, be embodied in different forms and should not be construed as limited to the exemplary embodiments set forth herein. Rather, these exemplary embodiments are provided so that this disclosure will be thorough and complete, and will fully convey the scope of the present disclosure to those skilled in the art. Throughout the disclosure, like reference numerals refer to like parts throughout the various figures and exemplary embodiments of the present disclosure.

FIG. 2 is a flowchart illustrating a method for controlling an SSC-SCC system for increasing an SSC distance using SCC in accordance with an exemplary embodiment of the present disclosure. The method described herein below may be executed by a controller. Referring to FIG. 2, the method for controlling an SSC-SCC system for increasing an SSC distance using SSC in accordance with the exemplary embodiment of the present disclosure may include determining whether a vehicle in operation satisfies a preset SSC entry condition (S100); entering an SSC mode or maintaining the SSC entry state when the vehicle satisfies the SSC entry condition (S200); measuring a distance from a preceding vehicle (S300), after the entry or maintenance step S200; determining whether the distance measured at the measurement step S300 is equal to or less than a preset reference distance (S400); and performing SCC braking in response to determining that the measured distance is equal to or less than the preset reference distance (S500).

The SSC entry condition may be set to a condition in which an accelerator pedal and a brake pedal are not operated (e.g., remain disengaged or no pressure is exerted onto the pedals) and the current vehicle speed is equal to or greater than a preset reference vehicle speed. In other words, since the accelerator pedal and the brake pedal are not operated, no driver intention of accelerating or decelerating the vehicle is detected. Furthermore, since the current vehicle speed is equal to or greater than the preset reference vehicle speed, SSC may be performed sufficiently. The preset reference vehicle speed may indicate the minimum speed at which coasting may be performed. The reference vehicle speed may be changed based on the vehicle type and design.

When the vehicle in operation does not satisfy the preset SSC entry condition, the SSC entry state may be released or the SSC release state may be maintained (S700). In other words, at step S700 of releasing the SSC entry state or maintaining the SSC release state, fuel supply to an engine 400 may be resumed to restart the engine 400, and a clutch 500 may be engaged. When the driver has an intention of accelerating or decelerating the vehicle by engaging the accelerator pedal or the brake pedal, the SSC mode may be released to operate the vehicle to immediately respond to the driver's intention of accelerating or decelerating the vehicle. Alternatively, when the vehicle is unable to maintain the SSC entry state due to the current vehicle speed being less than the preset reference vehicle speed, the SSC mode may be released to immediately operate the vehicle.

At the entry or maintenance step S200, the fuel supply to the engine 400 may be cut off to stop the engine 400, and the clutch 500 may be released. In other words, as the fuel supply to the engine is cut off to stop the engine and the clutch is released to block the power transfer of the transmission, the SSC mode may be started to improve the fuel efficiency of the vehicle. Additionally, the distance from the preceding vehicle may be measured and whether the distance measured is equal to or less than the preset reference distance may be determined. To automatically maintain the distance from the preceding vehicle using SCC, the distance from the preceding vehicle may be measured to determine whether the measured distance is equal to or less than the preset reference distance. At this time, the preset reference distance may be set differently based on the engagement of a brake or the intention of a designer.

Furthermore, SCC braking may be performed in response to determining that the measured distance is less than the preset reference distance. More specifically, the brake 600 may be operated in a state where the engine 400 is stopped and the clutch 500 is released, or the operation state of the brake 600 may be maintained. Thus, although a driver does not operate the brake pedal, the distance from the preceding vehicle may be automatically maintained. In other words, since the SSC entry state is not released, the fuel efficiency of the vehicle may be continuously improved. Furthermore, since the brake 600 is operated by the SCC to maintain the distance from the preceding vehicle, the safety of the driver may be secured. Thus, it may be possible to prevent the reduction in durability or the increase in fatigue of the driver, which may occur when the SSC mode is frequently released or the vehicle frequently reenters the SSC mode due to changes in distance from the preceding vehicle.

In the method for controlling the SSC-SCC system for increasing an SSC distance the SCC, the distance determination step S400 may be repeated after the SCC braking performance step S500. In other words, whether the distance from the preceding vehicle was increased by the SCC braking and exceeded the preset reference distance may be determined again. Furthermore, the method for controlling the SSC-SCC system for increasing an SSC distance using SCC may include releasing the SCC braking or maintaining the SCC braking release state (S600), in response to determining that the measured distance is greater than the preset reference distance. When the distance from the preceding vehicle is increased by the SCC braking and exceeds the preset reference distance, the SCC braking does not need to be performed. Thus, the SCC braking may be released to increase the SSC distance in the SSC mode, which makes it possible to maximize the improvement of fuel efficiency.

More specifically, at step S600 of terminating the SCC braking or maintaining the SCC braking release state, the operation of the brake 600 may be released in a state where the engine 400 is stopped and the clutch 500 is released. Thus, since the operation of the brake 600 is released in the SSC entry state, the speed of the vehicle may not be reduced, but the fuel efficiency by the SSC may be continuously improved.

In the method for controlling the SSC-SCC system for increasing an SSC distance using SCC, the determination of whether the vehicle in operation (e.g., the traveling vehicle) satisfies the preset SSC entry condition may be repeated, after the step S600 of releasing the SCC braking or maintaining the SCC braking release state. In other words, since the vehicle speed was reduced by the SCC braking, whether the current vehicle speed is equal to or greater than the preset reference vehicle speed may be determined again, the preset reference vehicle speed indicating the minimum speed at which coasting may be performed.

Figure 3:
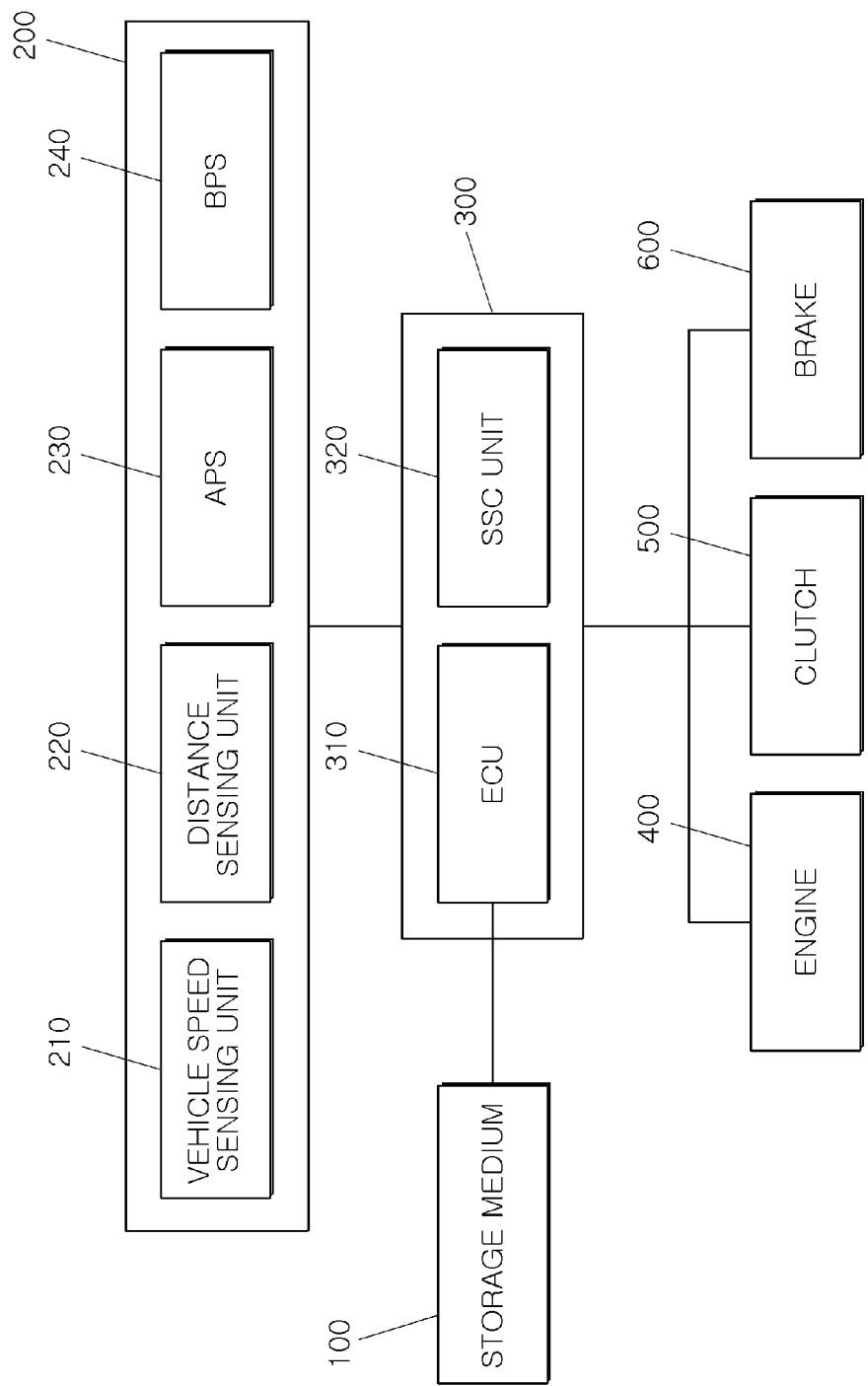
FIG. 3 is a block diagram illustrating an SSC-SCC system for increasing an SSC distance using SCC in accordance with an exemplary embodiment of the present disclosure.

FIG. 3 is a block diagram illustrating an SSC-SCC system for increasing an SSC distance using SCC. Referring to FIG. 3, the SSC-SCC system for increasing an SSC distance using SCC in accordance with the exemplary embodiment of the present disclosure may include a storage medium 100, a sensing unit 200, a controller 300, an engine 400, a clutch 500 and a brake 600.

The storage medium 100 may be configured to store the method for controlling the SSC-SCC for increasing an SSC distance SCC. The sensing unit 200 may include a vehicle speed sensing unit 210 (e.g., sensor) configured to sense the current speed of a vehicle, a distance sensing unit 220 (e.g., sensor) configured to sense a distance from a preceding vehicle, an APS 230 configured to sense whether an accelerator pedal is engaged, and a BPS 240 configured to sense whether a brake pedal is engaged.

The controller 300 may be configured to operate the vehicle according to the control method stored in the storage medium 100, based on the current vehicle speed, the distance from the preceding vehicle, and the operation states of the accelerator pedal and the brake pedal, sensed by the sensing unit 200. The controller 300 may include an SCC unit 320 configured to operate the engine 400 and the clutch 500 to allow the vehicle to enter the SSC mode or release the SSC entry state of the vehicle to maintain the distance from the preceding vehicle at a preset reference distance or greater. The SSC-SCC system for increasing an SSC distance using SCC may include the engine 400 stopped or restarted by the controller 300, the clutch 500 engaged or released by the controller 300, and the brake 600 operated or released by the controller 300.

In accordance with the exemplary embodiments of the present disclosure, since a distance from a preceding vehicle may be automatically maintained through SCC even when a brake pedal is disengaged (e.g., not operated by a driver) when the distance from the preceding vehicle decreases, the period in which the SSC entry state is maintained may be increased to improve fuel efficiency. Furthermore, the SSC-SCC system for increasing an SSC distance using SSC and the method for controlling the same may prevent the reduction in durability or the increase in fatigue of a driver, which may occur when the SSC mode is frequently released or the vehicle frequently reenters the SSC mode due to changes in distance from the preceding vehicle.

While the present disclosure has been described with respect to the specific exemplary embodiments, it will be apparent to those skilled in the art that various changes and modifications may be made without departing from the spirit and scope of the disclosure as defined in the following claims.

What is claimed is:

1. A method for controlling a Start/Stop Coasting (SSC)-Smart Cruise Control (SCC) system for increasing a SSC distance using SCC, comprising:
   determining, by a controller, whether a vehicle in operation satisfies a preset SSC entry condition;
   entering, by the controller, a SSC mode or maintaining a SSC entry state, when the vehicle satisfies the preset SSC entry condition;
   measuring, by the controller, a distance from a preceding vehicle using a sensor after the entering of the SSC mode or the maintaining of the SSC entry state;
   determining, by the controller, whether the measured distance is equal to or less than a preset reference distance; and
   performing, by the controller, SCC braking in response to determining that the measured distance is equal to or less than the preset reference distance, while maintaining the SSC entry state,
   wherein the performing of the SCC braking includes operating a brake or maintaining an operation state of the brake, in a state where an engine is stopped and a clutch is released.

2. The method of claim 1, wherein the determination of whether the measured distance is equal to or less than the preset reference distance is repeated after the performing of the SCC braking.

3. The method of claim 1, further comprising:
   releasing, by the controller, the SCC braking or maintaining a SCC braking release state in response to determining that the measured distance exceeds the preset reference distance.

4. The method of claim 3, wherein the determination of whether the vehicle in operation satisfies the preset SSC entry condition is repeated, after the releasing of the SCC braking or the maintaining of the SCC braking release state.

5. The method of claim 3, wherein the releasing of the SCC braking or the maintaining of the SCC braking release state includes releasing the operation of the brake in a state where the engine is stopped and the clutch is released.

6. The method of claim 1, further comprising:
   releasing, by the controller, the SSC entry state or maintaining a SSC release state in response to determining that the vehicle in operation does not satisfy the preset SSC entry condition.

7. The method of claim 6, wherein the releasing of the SSC entry state or the maintaining of the SSC release state includes restarting the engine by resuming fuel supply to the engine, and engaging the clutch.

8. The method of claim 1, wherein the preset SSC entry condition includes a condition in which an accelerator pedal is not operated, a brake pedal is not operated, and the current vehicle speed is equal to or greater than a preset reference vehicle speed.

9. The method of claim 1, wherein the entering of the SSC mode or the maintaining of the SSC entry state includes stopping an engine by cutting off fuel supply to the engine, and releasing a clutch.

10. A Start/Stop Coasting (SSC)-Smart Cruise Control (SCC) system for increasing a SSC distance using SCC, comprising:
    a storage medium configured to store a method for operating the SSC-SCC system for increasing an SSC distance using SCC;
    a sensing unit configured to sense a current vehicle speed, a distance from a preceding vehicle, and whether an accelerator pedal and a brake pedal are operated; and
    a controller configured to operate a vehicle according to the method of the SSC-SCC system stored in the storage medium, based on the current vehicle speed, the distance from the preceding vehicle, and the operation states of the accelerator pedal and the brake pedal sensed by the sensing unit,
    wherein the controller includes an electronic control unit (ECU) configured to operate an engine and a clutch to cause the vehicle to enter a SSC mode or release the vehicle from a SSC entry state, and a SCC unit configured to operate a brake to maintain the distance from the preceding vehicle at a preset reference distance or greater while maintaining the SSC entry state, by operating the brake or maintaining an operation state of the brake, in a state where the engine is stopped and the clutch is released.

11. The SSC-SCC system of claim 10, wherein:
    the engine is stopped or restarted by the controller.

12. The SSC-SCC system of claim 11, wherein:
    the clutch is engaged or released by the controller.

13. The SSC-SCC system of claim 12, wherein:
    the brake is operated or released by the controller.

14. The SSC-SCC system of claim 10, wherein the sensing unit includes a vehicle speed sensing unit configured to sense the current vehicle speed.

15. The SSC-SCC system of claim 14, wherein the sensing unit includes a distance sensing unit configured to sense the distance from the preceding vehicle.

16. The SSC-SCC system of claim 15, wherein the sensing unit includes an accelerator pedal position sensor (APS) configured to sense whether the accelerator pedal is operated.

17. The SSC-SCC system of claim 16, wherein the sensing unit includes a brake pedal position sensor (BPS) configured to sense whether the brake pedal is operated.

* * * * *